J. J. BOWES, Jr.
HOSE COUPLING.
APPLICATION FILED APR. 17, 1917.
1,232,193.
Patented July 3, 1917.
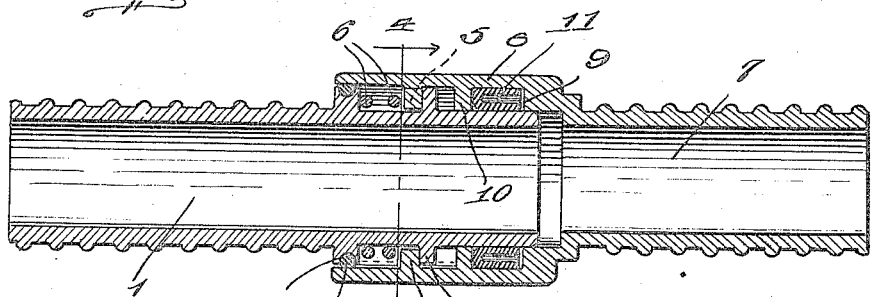
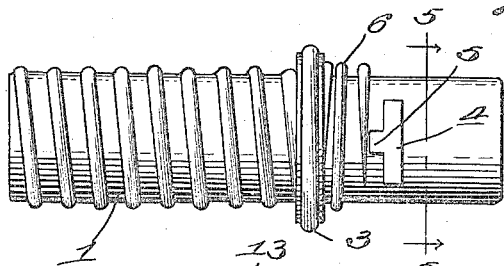
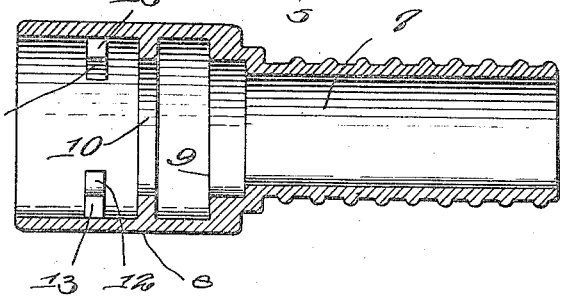
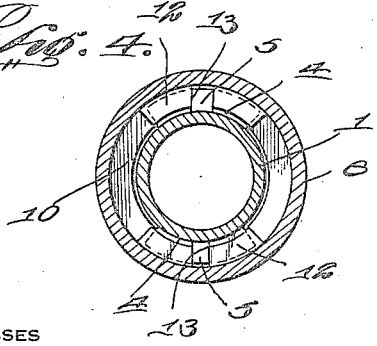
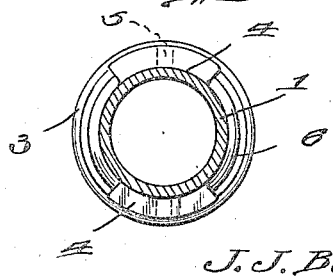
WITNESSES
Frederick L. Fox
INVENTOR
J. J. Bowes Jr.
BY Victor J. Evans.
ATTORNEY

UNITED STATES PATENT OFFICE.

JOHN J. BOWES, JR., OF PENSACOLA, FLORIDA.

HOSE-COUPLING.

1,232,193.  Specification of Letters Patent.  Patented July 3, 1917.

Application filed April 17, 1917. Serial No. 162,634.

*To all whom it may concern:*

Be it known that I, JOHN J. BOWES, Jr., a citizen of the United States, residing at Pensacola, in the county of Escambia and State of Florida, have invented new and useful Improvements in Hose-Couplings, of which the following is a specification.

This invention relates to improvements in hose couplings, the object of the invention being to provide an improved hose coupling in which water tight joints are secured between the sleeve and plug members so that water or other liquid from the interior and dirt from the exterior are excluded from the locking parts of the coupling and also from the spring which coacts with the coupling members to yieldably hold the coupling members in locked or coupled position.

With the above and other objects in view the invention consists in the construction, combination and arrangement of devices hereinafter described and claimed.

In the accompanying drawings:—

Figure 1 is a vertical longitudinal sectional view of a hose coupling constructed and arranged in accordance with my invention and showing the members thereof coupled.

Fig. 2 is an elevation of the plug member.

Fig. 3 is a detailed longitudinal sectional view of the sleeve member.

Figs. 4 and 5 are transverse sectional views taken respectively on the planes indicated by the lines 4—4 of Fig. 1 and 5—5 of Fig. 2.

The plug member 1 is provided at a suitable distance from its outer end with an annular circumferential flange 2 which has a peripheral groove in which a packing ring 3 is fitted. At a point spaced from the outer end of the plug member and also from the flange 2 are a pair of oppositely arranged spaced segmental locking flanges 4 each of which is provided at its center with an inwardly extending lug 5. A coiled extensile spring 6 is arranged on the plug member between the flanges 2 and 4.

The sleeve member 7 has a diametrically enlarged outer end 8 to receive the plug member and the flanges 2 and 4 thereof and so constructed that the packing ring 3 will fit tightly in the outer end of the sleeve and effect a tight joint between said members. Near the inner end of the enlarged portion of the sleeve is an annular shoulder 9. Spaced from the shoulder 9 is an annular inwardly extending flange 10, a chamber being formed between the shoulder 9 and the flange 10 for the reception of a packing gasket 11 of yielding material which will make a tight joint between the plug and sleeve sections when coupled together and thereby prevent water or dirt from entering the coupling. The sleeve is also provided at a point spaced from the outer end thereof and also spaced from the flange 10 with a pair of spaced flanges 12 each of which has a central open slot 13. The width of the space between the flanges 12 is slightly greater than the width of the flanges 4 of the plug so that when the plug is inserted in the sleeve the flanges 4 pass between the flanges 12. The outer end of the spring 6 comes in contact with the flanges 12 when the members are being coupled and said spring becomes compressed, as will be understood. The flange 10 forms a stop which engages the flanges 4 and limits the inward movement of the plug in the sleeve. One of said members is then turned a sufficient distance to cause the lugs 5 of the flanges 4 to register with the slots 13 of the flanges 12, the spring causing said lugs to engage in said slots and coacting with the flanges 4 and 12 to yieldably hold the plug and sleeve members in coupled and locked relation.

The packing gasket 11 is provided with lips of tapered form, as shown and hence when the plug and sleeve members are coupled together the pressure within the coupling causes the gasket to be expanded and effect a tight joint between said members.

To uncouple the members they are first moved relatively in opposite directions against the tension of the spring 6 to disengage the lugs 5 from the slots 13 and are then turned a sufficient distance to cause the flanges 4 to move outwardly through the spaces between the flanges 12, as will be understood.

While I have herein shown and described a preferred form of my invention I would have it understood that changes may be made in the form, proportion and construction of the several parts, without departing from the spirit of my invention and within the scope of the appended claims.

Having thus described my invention, I claim:—

1. In a hose coupling, a sleeve member having an interior annular shoulder near its inner end, an interior annular flange spaced from said shoulder, a packing gasket between said flange and shoulder, and interior spaced segmental flanges spaced from said flange and also from the outer end of said member, each of said segmental flanges having an open slot; in combination with a plug member to enter the sleeve member and gasket, and having an annular flange to fit in the sleeve member and also having segmental flanges to pass between the segmental flanges of the sleeve member and provided with lugs to enter the open slots thereof, and a spring on the plug member to bear between the flange thereof and the spaced segmental flanges of the sleeve member and yieldably hold said members in locked relation.

2. In a hose coupling, a sleeve member having an interior annular shoulder near its inner end, an interior annular flange spaced from said shoulder, a packing gasket between said flange and shoulder, and interior spaced segmental flanges spaced from said flange and also from the outer end of said member, each of said segmental flanges having an open slot; in combination with a plug member to enter the sleeve member and gasket, and having an annular flange to fit in the sleeve member and also having segmental flanges to pass between the segmental flanges of the sleeve member and provided with lugs to enter the open slots thereof, and a spring on the plug member to bear between the flange thereof and the spaced segmental flanges of the sleeve member and yieldably hold said members in locked relation, the said annular flange of the plug member having a peripheral groove, and a packing ring in said groove and bearing in the sleeve member.

In testimony whereof I affix my signature.

JOHN J. BOWES, Jr.